(12) United States Patent
Nair et al.

(10) Patent No.: US 11,892,103 B2
(45) Date of Patent: Feb. 6, 2024

(54) SHROUD FOR SUBSEA FLANGE PROTECTION

(71) Applicant: J. RAY MCDERMOTT, S.A., Houston, TX (US)

(72) Inventors: Sajith Nair, Dubai, AE (US); Manoj Kulshrestha, Dubai, AE (US); Nawin Singh, Dubai, AE (US); Olusola Bode Oguntuberu, Houston, TX (US)

(73) Assignee: J. Ray McDermott S.A., Houston, TX (US)

( * ) Notice: Subject to any disclaimer, the term of this patent is extended or adjusted under 35 U.S.C. 154(b) by 325 days.

(21) Appl. No.: 17/436,863

(22) PCT Filed: Feb. 25, 2020

(86) PCT No.: PCT/US2020/019628
§ 371 (c)(1),
(2) Date: Sep. 7, 2021

(87) PCT Pub. No.: WO2020/180532
PCT Pub. Date: Sep. 10, 2020

(65) Prior Publication Data
US 2022/0163160 A1   May 26, 2022

Related U.S. Application Data

(60) Provisional application No. 62/867,558, filed on Jun. 27, 2019, provisional application No. 62/814,469, filed on Mar. 6, 2019.

(51) Int. Cl.
*F16L 1/12* (2006.01)
*F16L 23/02* (2006.01)

(52) U.S. Cl.
CPC ............... *F16L 1/123* (2013.01); *F16L 23/02* (2013.01)

(58) Field of Classification Search
CPC .................................. F16L 1/123; F16L 23/02
See application file for complete search history.

(56) References Cited

U.S. PATENT DOCUMENTS 5,941,662 A * 8/1999 Weaver ..................... E02D 5/60
405/211.1

FOREIGN PATENT DOCUMENTS

| CN | 207279133 U | 4/2018 | |
|---|---|---|---|
| CN | 208090168 U | 11/2018 | |
| CN | 113294606 A * | 8/2021 | ............ F16L 23/026 |

OTHER PUBLICATIONS

International Search Report and Written Opinion in related application PCT/US2020/019628 dated Jun. 15, 2020.

* cited by examiner

*Primary Examiner* — Janine M Kreck
(74) *Attorney, Agent, or Firm* — Patterson + Sheridan, LLP

(57) ABSTRACT

Embodiments of the disclosure include methods and apparatus for a shroud that permits efficient installation and removal thereof from a flange of a pipeline. In one embodiment, a shroud is disclosed that includes a cover structure, and a plurality of retaining members coupled to an interior surface of the cover structure. Each of the plurality of retaining members comprises a rectangular arm coupled to a hinge structure, the hinge structure comprising a spring that fixes the rectangular arm in a position that is substantially orthogonal to a plane of the interior surface, wherein the hinge structure allows movement of the rectangular arm in a first direction and temporarily prevents movement of the rectangular arm in a second direction opposite to the first direction.

20 Claims, 17 Drawing Sheets

SHROUD FOR SUBSEA FLANGE PROTECTION

CROSS-REFERENCE TO RELATED APPLICATIONS

This application claims benefit of U.S. provisional patent application Ser. No. 62/867,558, filed Jun. 27, 2019, and U.S. provisional patent application Ser. No. 62/814,469, filed Mar. 6, 2019; each of which is herein incorporated by reference.

BACKGROUND

Field

Embodiments of the disclosure relate to methods and apparatus for protection of underwater pipeline flange connections.

Description of the Related Art

Shrouds are utilized in the petrochemical industry to protect underwater pipelines from damage that may be caused by anchors dragged in the vicinity of the pipeline. For example, anchors, lowered toward the floor of a body of water from a vessel, typically drag across the floor for a distance before being fixed to the floor. The dragging of the anchor across a pipeline may cause the anchor to snag one or more studs projecting from a flange connecting two tubulars of the pipeline. Similarly, during the pipeline construction phase, derrick lay barge anchors are moved by tug boats and in this process anchor wires get slack and tangle with protruded flange studs, if not protected by a shroud.

Conventional shrouds are installed by divers using fasteners, such as bolts, that connect a cover structure of the shroud to the flange. The installation process is time consuming as multiple bolts are fitted through openings in the cover structure and tightened. Similarly, removal of the shroud is time consuming as the bolts are typically cut into pieces in order to free the shroud from the flange due to rusting and/or marine growth.

What is needed is a shroud that enables more efficient installation and removal from a pipeline.

SUMMARY

Embodiments of the disclosure include methods and apparatus for a shroud that permits efficient installation and removal thereof from a flange of a pipeline. In one embodiment, a shroud is disclosed that includes a cover structure, and a plurality of retaining members coupled to an interior surface of the cover structure. Each of the plurality of retaining members comprises an arm coupled to a hinge and a spring, the spring utilized to temporarily fix the arm in a position that is substantially orthogonal to a plane of the interior surface, wherein the hinge allows movement of the arm in a first direction and temporarily prevents movement of the arm in a second direction opposite to the first direction.

In another embodiment, a shroud is disclosed that includes a cover structure sized to at least partially surround a flange of a pipeline, a plurality of retaining members coupled to an interior surface of the cover structure, each of the retaining members comprising a rectangular arm coupled to a pin, and a plate associated with each of the plurality of retaining members, each of the plates being fixed in a first position that allows movement of the rectangular arm in a first direction and temporarily prevents movement of the rectangular arm in a second direction opposite to the first direction, and each of the plates are movable to a second position that allows the rectangular arm to move in the second direction.

In another embodiment, a method for attaching a shroud to a flange of a pipeline is disclosed. The method includes lowering a cover structure toward the flange such that a plurality of rectangular arms coupled to and extending from an interior surface of the cover structure contact one or more studs extending from the flange, wherein each of the plurality of rectangular arms are coupled to a spring that provides a bias to the respective arms in a first direction and a first position, and continually lowering the cover structure to substantially surround the flange such that a weight of the cover structure overcomes the bias of the spring allowing the plurality of rectangular arms to move to a second position in a second direction opposite to the first direction and pass the one or more studs, wherein each of the plurality of rectangular arms move in the first direction to return to the first position after the respective rod passes a stud.

BRIEF DESCRIPTION OF THE DRAWINGS

So that the manner in which the above recited features can be understood in detail, a more particular description of embodiments of the disclosure, briefly summarized above, may be had by reference to the embodiments, some of which are illustrated in the appended drawings. It is to be noted, however, that the appended drawings illustrate only typical embodiments and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments of the disclosure relate to methods and apparatus for a shroud utilized to protect a flange of an underwater pipeline.

Figure 1:
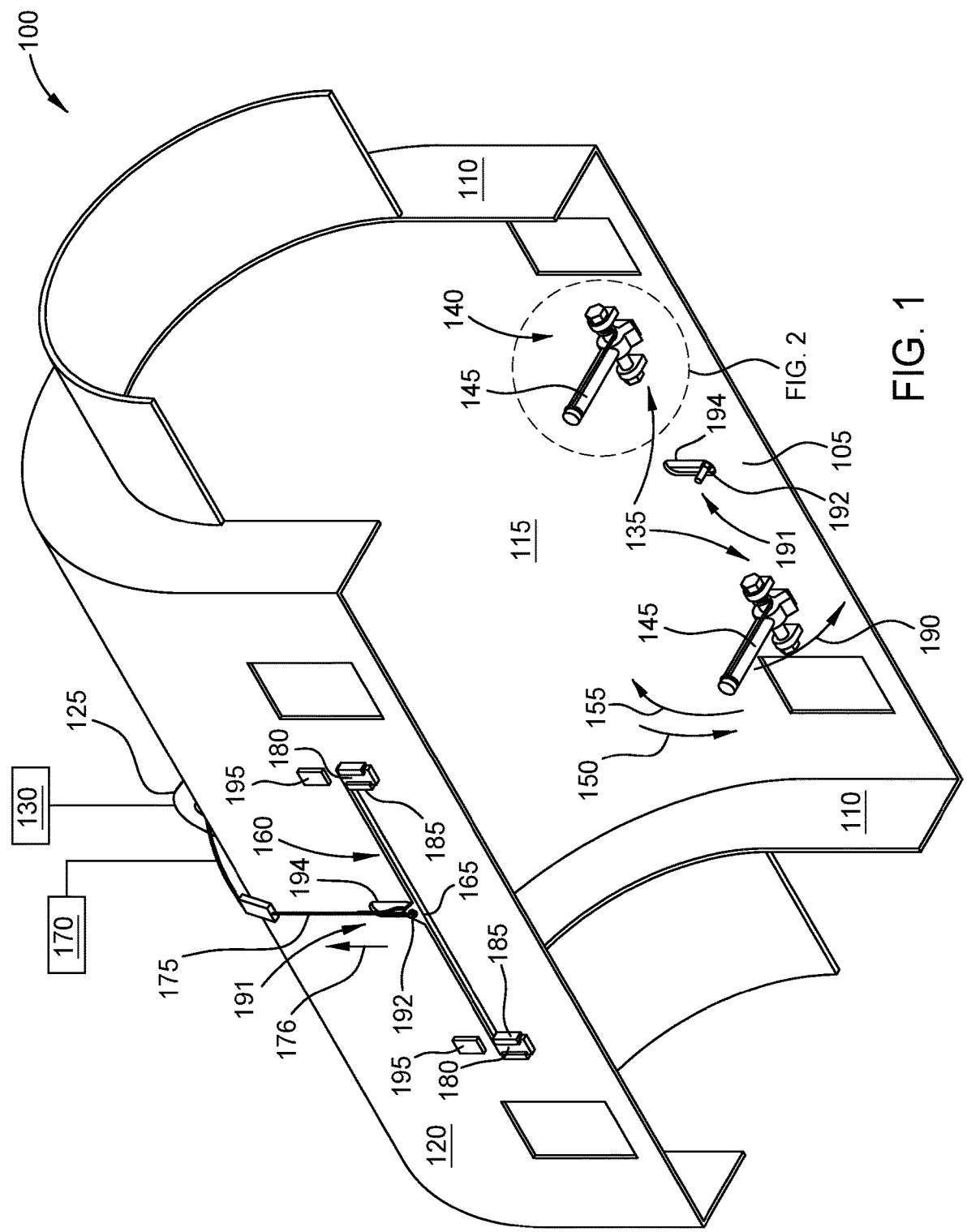
FIG. 1 is an isometric view of a shroud according to one implementation.

FIG. 1 is an isometric view of a shroud 100. The shroud 100 includes a cover structure 105 that is fitted about a circumference of a flange of a pipeline (shown in FIG. 3). Ends of the cover structure 105 include arc-shaped segments 110 that enclose a portion of the cover structure 105.

The cover structure 105 is broadly U-shaped and sized to surround the flange of the pipeline. Each of the arc-shaped segments 110 include an opening or slot formed therein that is sized to receive an outside diameter of the pipeline extending from the flange. The cover structure 105 as well as the arc-shaped segments 110 may be made of a metallic material or a polymer/non-metallic material. The geometry of the cover structure 105 that is metallic or non-metallic may vary based on streamlining the body thereof for installation/removal of the shroud 100, and/or ease of manufacturing. For example, the cover structure 105 may be designed with chamfered edges to facilitate ease of manufacturing, such as a moulding process (in the case of non-metallic materials), and optimized geometric design in terms of weight and cost.

The cover structure 105 includes an interior surface 115 and an exterior surface 120. The exterior surface 120 includes a hook interface 125. The hook interface 125 is configured to couple with a handling device 130 that lifts and lowers the shroud 100. The handling device 130 may be a winch or other transfer device provided on a surface vessel or a remotely operated vehicle (ROV). The shroud 100 is installed onto the flange from a position above the pipeline.

The shroud 100 includes a plurality of retaining members 135. Each of the retaining members 135 are utilized to fasten the shroud 100 to one or more studs (fasteners, such as bolts) extending from the flange in a generally parallel relation to the length of the pipeline. The retaining members 135 are coupled to the interior surface 115 of the cover structure 105.

Each of the retaining members 135 includes a hinge structure 140 and a rod 145 (i.e., a movable arm). Each of the retaining members 135 include a spring that biases the rod 145 in the direction of arrow 150 (described in detail below). The hinge structure 140 generally maintains the rod 145 in a position that is generally orthogonal to a plane of the interior surface 115 adjacent the hinge structure 140. The spring however allows movement of the rod 145 in the direction of arrow 155 (e.g., opposite the bias applied to the rod 145). The hinge structure 140 includes a rotatable block that functions as a stop thereby limiting rotational movement of the rod 145 in at least one direction, such as the direction of bias (described in more detail below).

The shroud 100 also includes a release member 160 associated with one or more of the retaining members 135. In FIG. 1, two release members 160 are included with the shroud 100, and are positioned on opposing outer sides of the cover structure 105. For example, one release member 160 is shown on one side of the cover structure 105 and is associated with two of the retaining members 135 on that side. Another release member 160 is not shown on the other side of the cover structure 105 that is associated with two retaining members 135 on the other side.

The release member 160 temporarily secures the retaining members 135 in the position shown in FIG. 1, but is utilized to facilitate retracting of the retaining members 135 when removing the shroud 100 from the flange, thus allowing selective release of the retaining members 135. The release process is described in detail below.

Each of the release members 160 includes a hook member 165 adapted to couple to a lift mechanism 170 via a cable 175. The hook member 165 includes two plates 180 that fit into a respective pocket 185. Each of the plates 180 are slidably engaged in the pockets 185 such that the plates 180 may be moved in the direction of arrow 176 based on movement of the hook member 165. When the plates 180 are removed in the direction of arrow 176, a portion of the retaining member 135 adjacent to the respective plate 180 is exposed, and the retaining member 135 can move in the direction of arrow 190 in order to release the shroud 100 from the flange. The lift mechanism 170 may be a handling device similar to the handling device 130 described above. Alternatively, each of the release members 160 and/or the plates 180 may be operated (i.e., removed) manually by personnel (e.g., divers).

In some embodiments, the release members 160 are coupled to the cover structure 105 via a retaining structure 191. Each of the retaining structures 191 include a fastener 192 coupled to the hook member 165 (or other portion of the release members 160). The fastener 192 is slidably engaged with a slot 194 formed through the cover structure 105. The slot 194 allows up/down movement of the release member 160 while the fastener 192 retains the release member 160 onto the cover structure 105. In addition, each of the retaining structures 191 may include one or more blocks 195. The one or more blocks 195 extend from the exterior surface 120 of the cover structure 105. The one or more blocks 195 are utilized to limit the upward movement of the hook member 165 and/or the plates 180. The blocks 195 serve as a stop for the plates 180 allowing the plates 180 to be removed to expose a respective window formed in the cover structure 105 (shown below), but prevent the plates 180 from being completely released from the pockets 185.

Figure 2:
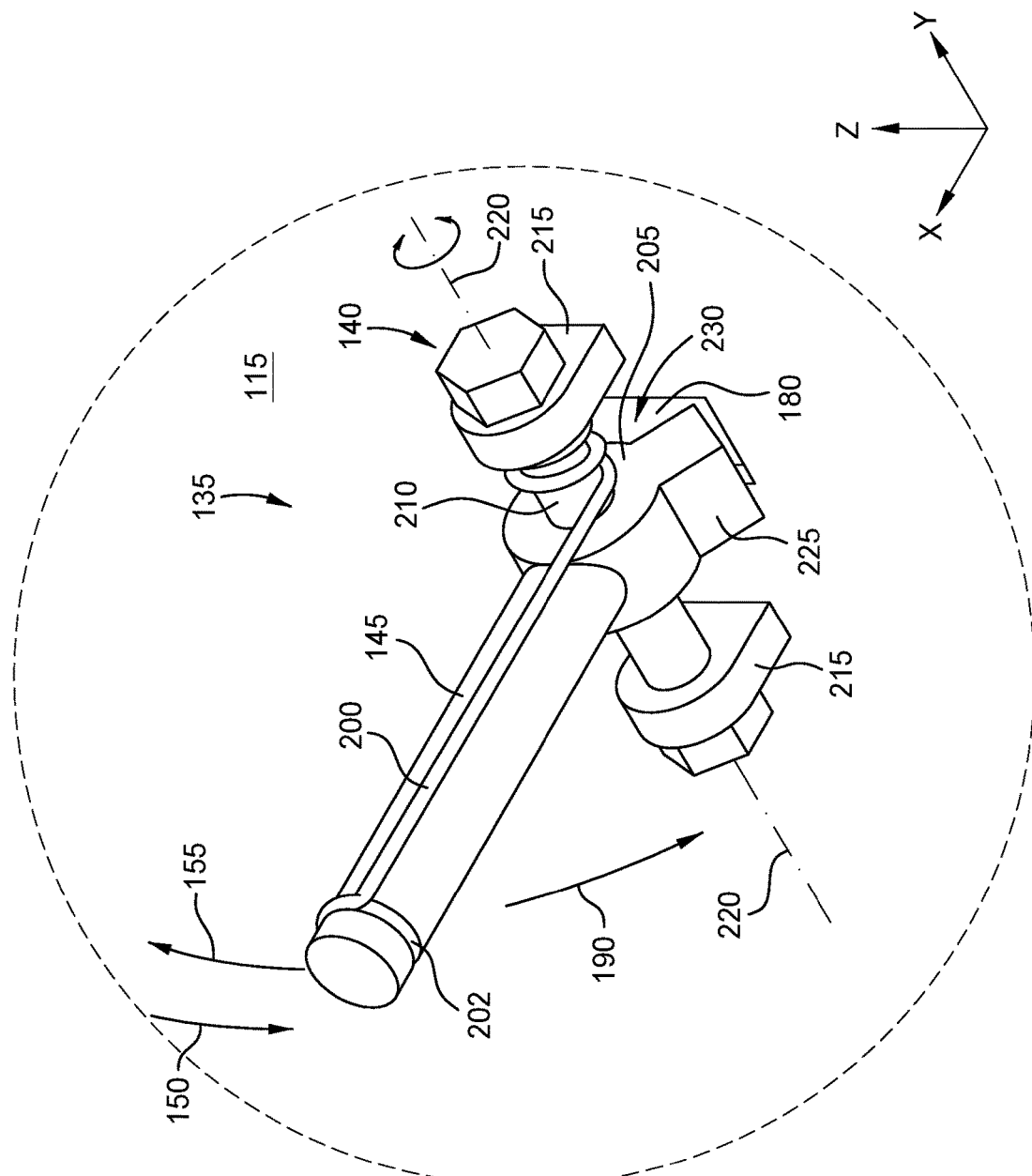
FIG. 2 is an enlarged isometric view of one of the retaining members of the shroud.

FIG. 2 is an enlarged isometric view of one embodiment of the retaining members 135 of the shroud 100. The retaining member 135 includes the hinge structure 140 and the rod 145 as described above. The retaining member 135 also includes a spring 200 that biases the rod 145 in the direction of arrow 150. One end of the spring 200 is secured by a groove 202 formed in an end of the rod 145. The hinge structure 140 includes a rotatable block 205. The hinge structure 140 also includes a fastener 210, such as a bolt or pin that couples to a plurality of ears 215 (that are inwardly extending relative to the cover structure 105). Each of the ears 215 are coupled to the interior surface 115 of the cover structure 105 and extend from a plane of the interior surface 115 (in the Z direction) inwardly (in the X direction). The rod 145 is also coupled to the fastener 210, and moves about a rotational axis 220 of the fastener 210 in the direction of arrows 155 and 150 (e.g., a first direction and a second direction, respectively). The fastener 210 may function as a fulcrum for the rod 145 (i.e., lever) during operation.

Specifically, the rod 145 is coupled to the fastener 210 by the rotatable block 205. The spring 200 is also coupled to the fastener 210 and a portion of the spring 200 extends along a length of the rod 145. The hinge structure 140 generally maintains the rod 145 in a position that is generally orthogonal to a plane of the interior surface 115 (in the Z direction). The spring 200 however allows movement of the rod 145 in the direction of arrow 155.

Figure 15:
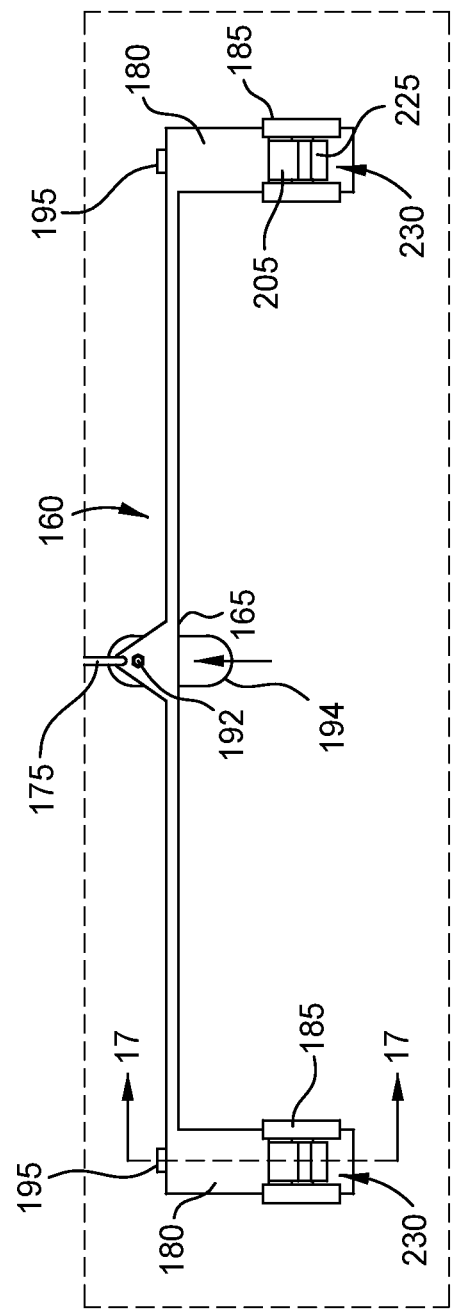
Figure 17:
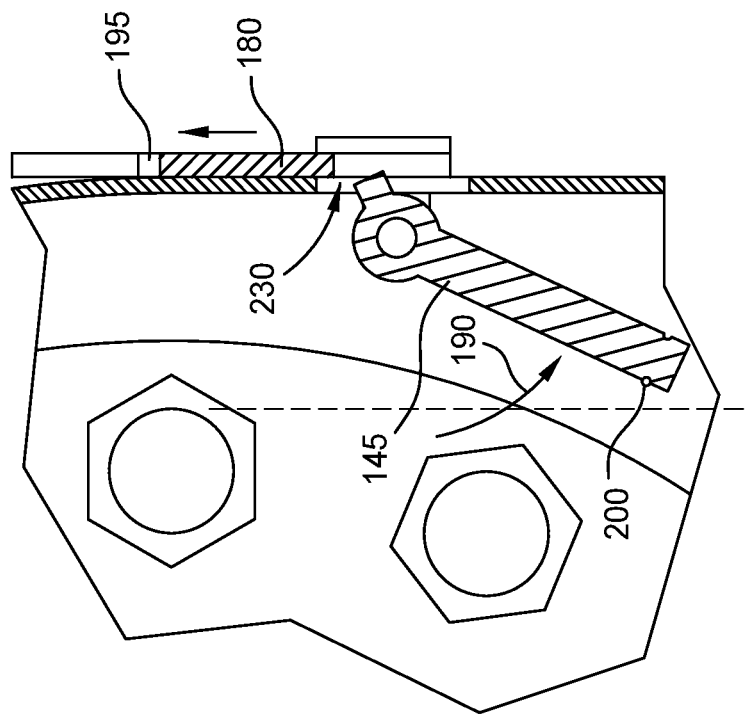
Figure 16:
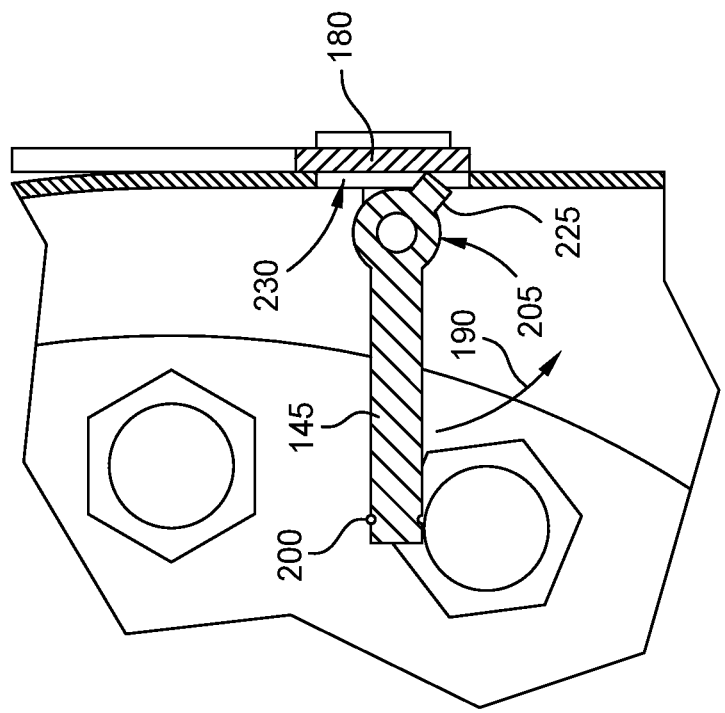

The rotatable block 205 includes a radially extending member 225 that contacts an interior surface of the plate 180 when the plate 180 is positioned in a window 230 formed in the cover structure 105 (the window 230 is more clearly seen in FIGS. 15-17). Thus, the rotatable block 205 functions as a stop thereby limiting movement of the rod 145 in the direction of arrow 150 when the plate 180 is in place. However, when the plate 180 is removed, such as by using the release member 160 shown and described in FIG. 1, the radially extending member 225 may extend into and/or through the window 230. This allows rotation of the rotatable block 205 and the rod 145 in the direction of arrow 190.

Figure 3:
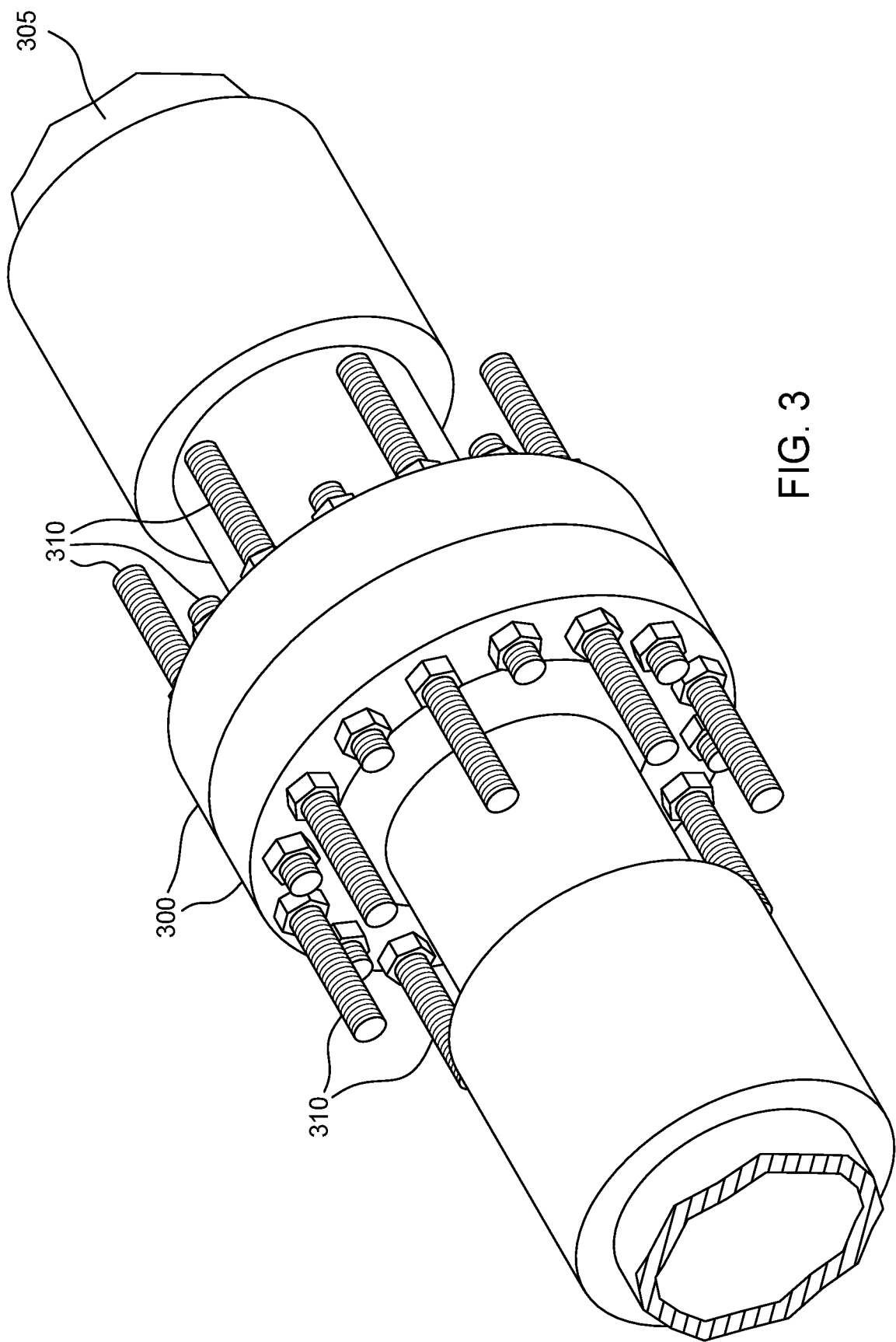
FIG. 3 is a schematic isometric view of a flange coupled to a pipeline.

The rotation of the rod 145 in the direction of arrow 190 allows the cover structure 105 to be released from a flange of a pipeline (both shown in FIG. 3).

FIGS. 3-17 are various schematic figures showing the installation and the removal of the shroud 100 onto a flange of a pipeline.

FIG. 3 is a schematic isometric view of a flange 300 coupling sections of a pipeline 305. The flange 300 includes a plurality of studs 310 extending therefrom.

Figure 4:
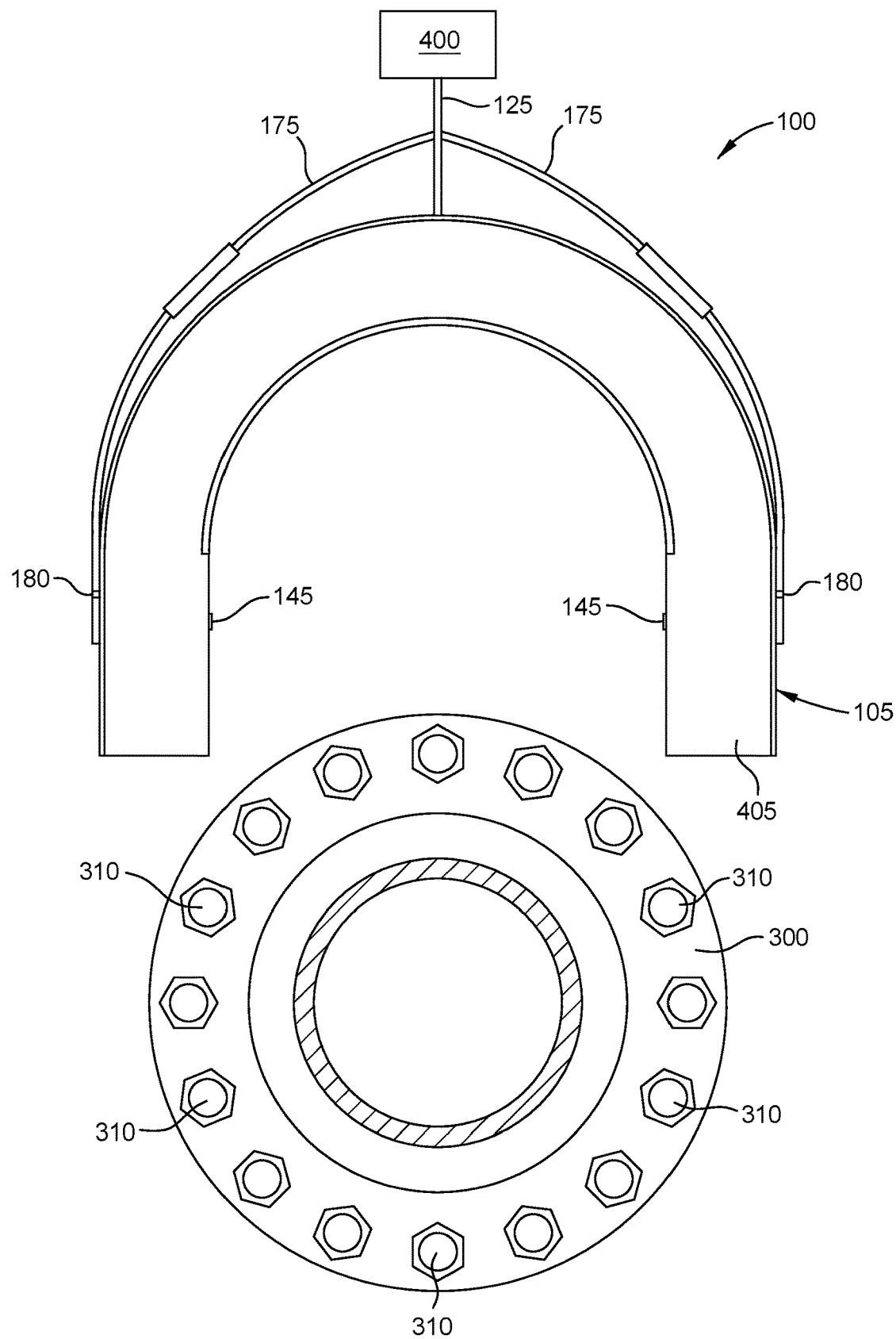
FIG. 4 is a schematic end view of the shroud being lowered toward the flange and the pipeline.

FIG. 4 is a schematic end view of the shroud 100 being lowered toward the flange 300. The shroud 100 is coupled to a transfer device 400 that may be one or both of the handling device 130 and the lift mechanism 170 described above. Ends of the rods 145 are seen protruding past a sidewall 405 of the cover structure 105.

Figure 5:
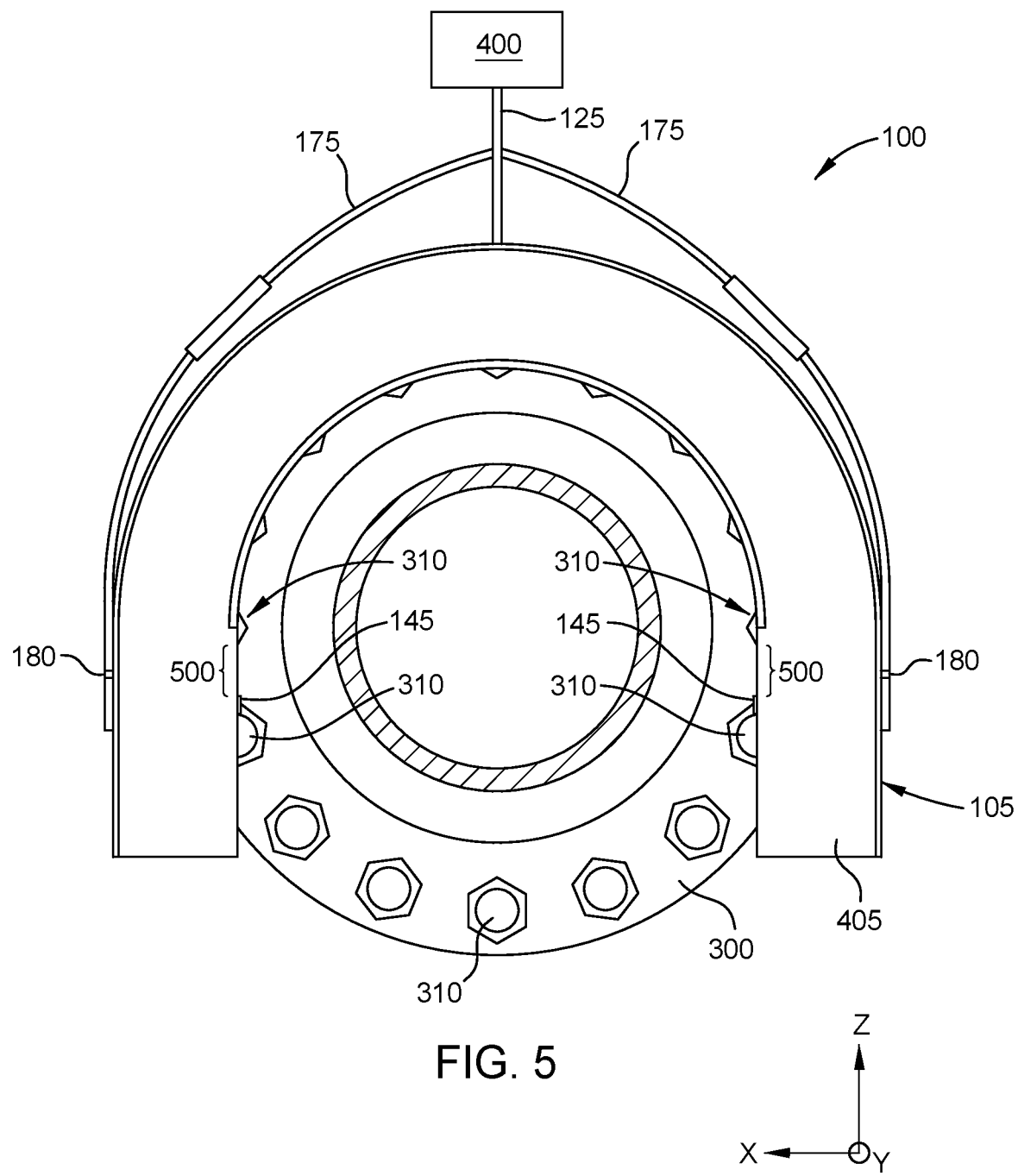
FIG. 5 is a schematic end view of the shroud lowered onto the flange of the pipeline.

FIG. 5 is a schematic end view of the shroud 100 lowered onto the flange 300 in an installed position. The rods 145 are also engaged with one or more of the plurality of studs 310. Similar to FIG. 4, ends of the rods 145 are seen protruding past the sidewall 405 of the cover structure 105. However, the rods 145 are positioned between two adjacent pairs of studs 310 thus limiting vertical movement (in the Z direction) of the shroud 100 by a distance 500 between the adjacent studs 310.

Figure 6:
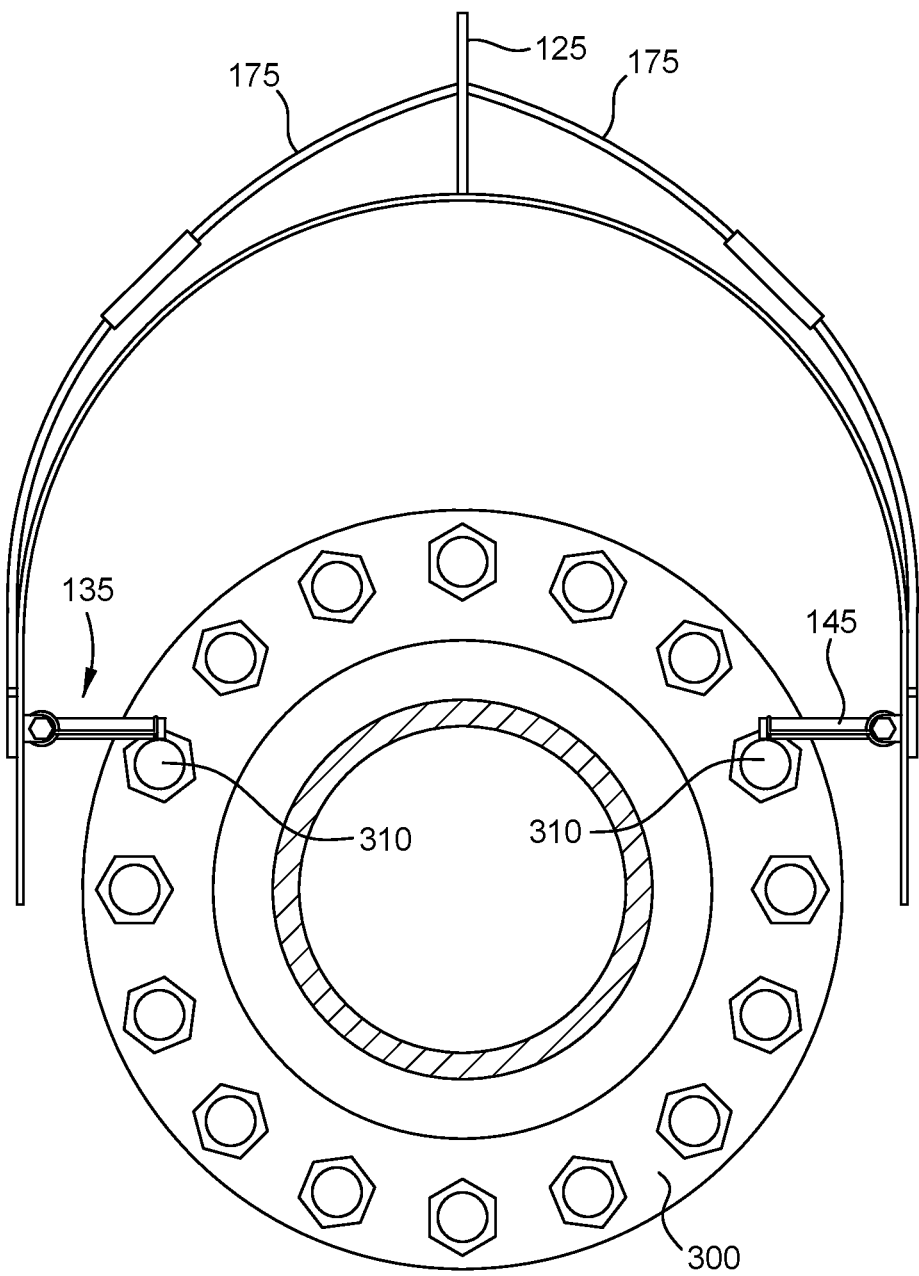
FIGS. 6-8 are schematic sectional views showing installation of the shroud onto the flange.
Figure 7:
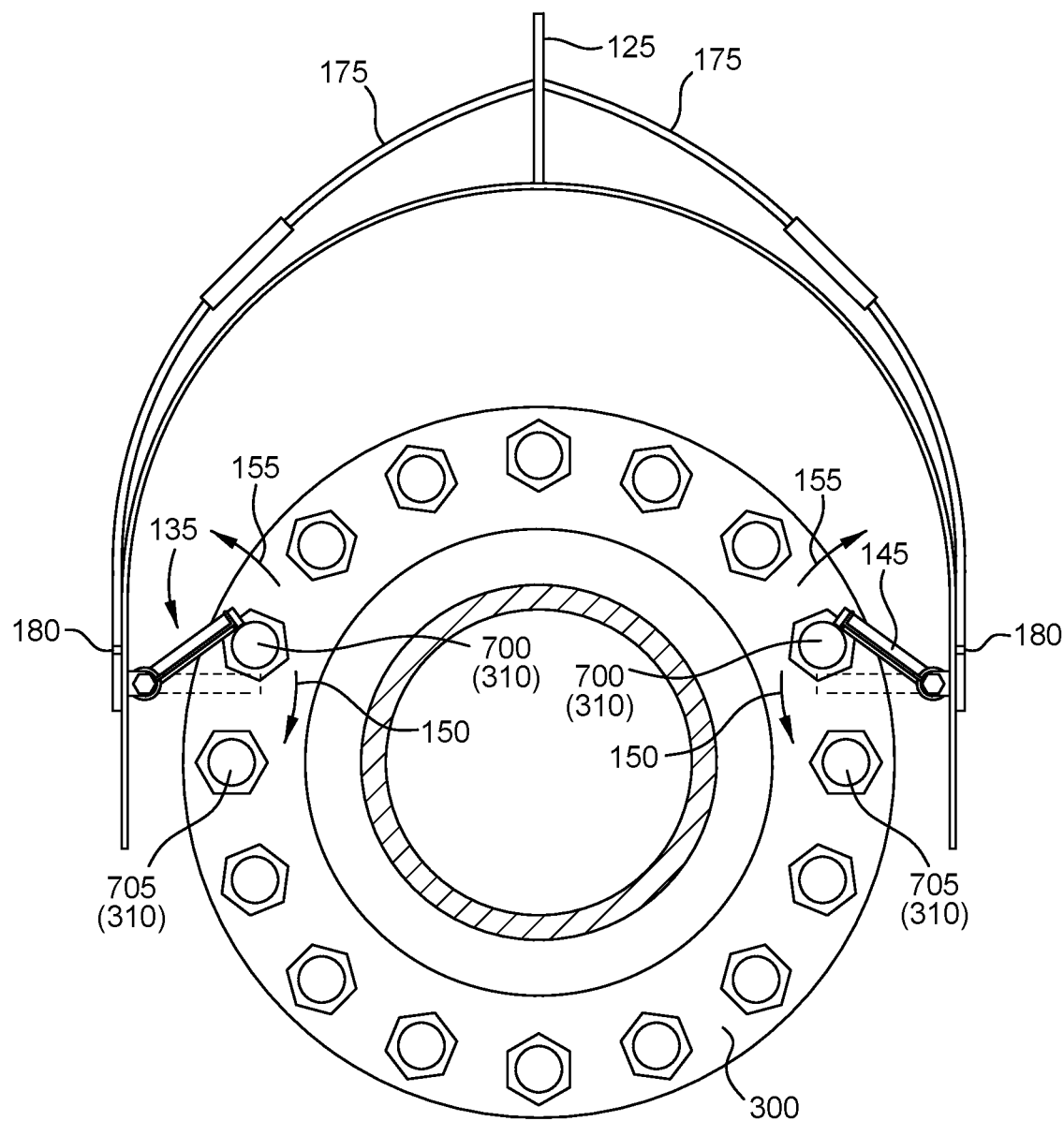
Figure 8:
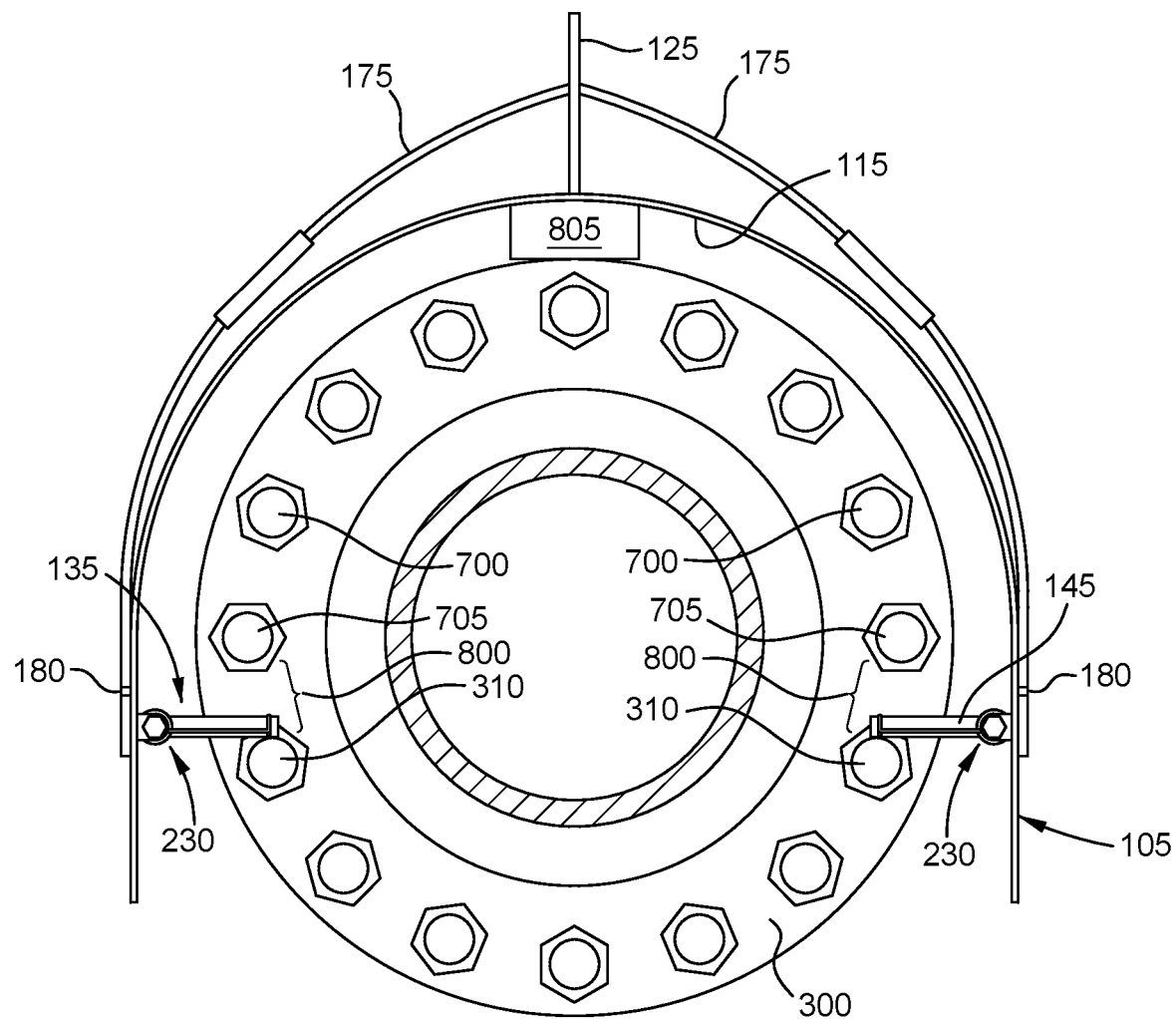

FIGS. 6-8 are schematic sectional views showing installation of the shroud 100 onto the flange 300. The sectional views show the interaction of the retaining members 135 with the studs 310.

FIG. 6 shows the shroud 100 lowered to a position such that the rods 145 of the retaining members 135 contact studs 310 on opposing sides of the flange 300.

FIG. 7 shows engagement of the rods 145 with a first set of studs 700 (i.e., two of the studs 310). Continued lowering of the shroud 100 provides a pressure against the retaining members 135 to overcome the bias provided by the springs 200 and provides movement of the rods 145 in the direction of arrow 155. After the rods 145 pass the first set of studs 700 with continued lowering of the shroud 100, the springs 200 move the rods 145 in the direction of arrow 150 (shown in phantom). For example, continued downward movement of the shroud 100 causes the rods 145 to move in the direction of arrow 155 and then snap back (e.g., return) to the position shown in FIG. 1 (e.g., orthogonal to the plane of the interior surface 115 of the cover structure 105). In a similar fashion, the continued lowering of the shroud 100 causes the rods 145 to engage with a second set of studs 705 (i.e., two of the studs 310) which causes the rods 145 to move in the direction of arrow 155, and then in the direction of arrow 150.

FIG. 8 shows the shroud 100 fully installed onto the flange 300. Continued downward movement of the shroud 100 causes the rods 145 to move in the direction of arrow 155 and then snap back in the direction of arrow 150 (both shown in FIGS. 1 and 7). In this position, the plates 180 are in place, covering the windows 230, which prevents movement of the rods 145 past the position shown in FIG. 8. A spacer 805, between the interior surface 115 of the cover structure 105 and the flange 300, may be utilized to prevent any further downward movement of the shroud 100.

Figure 9:
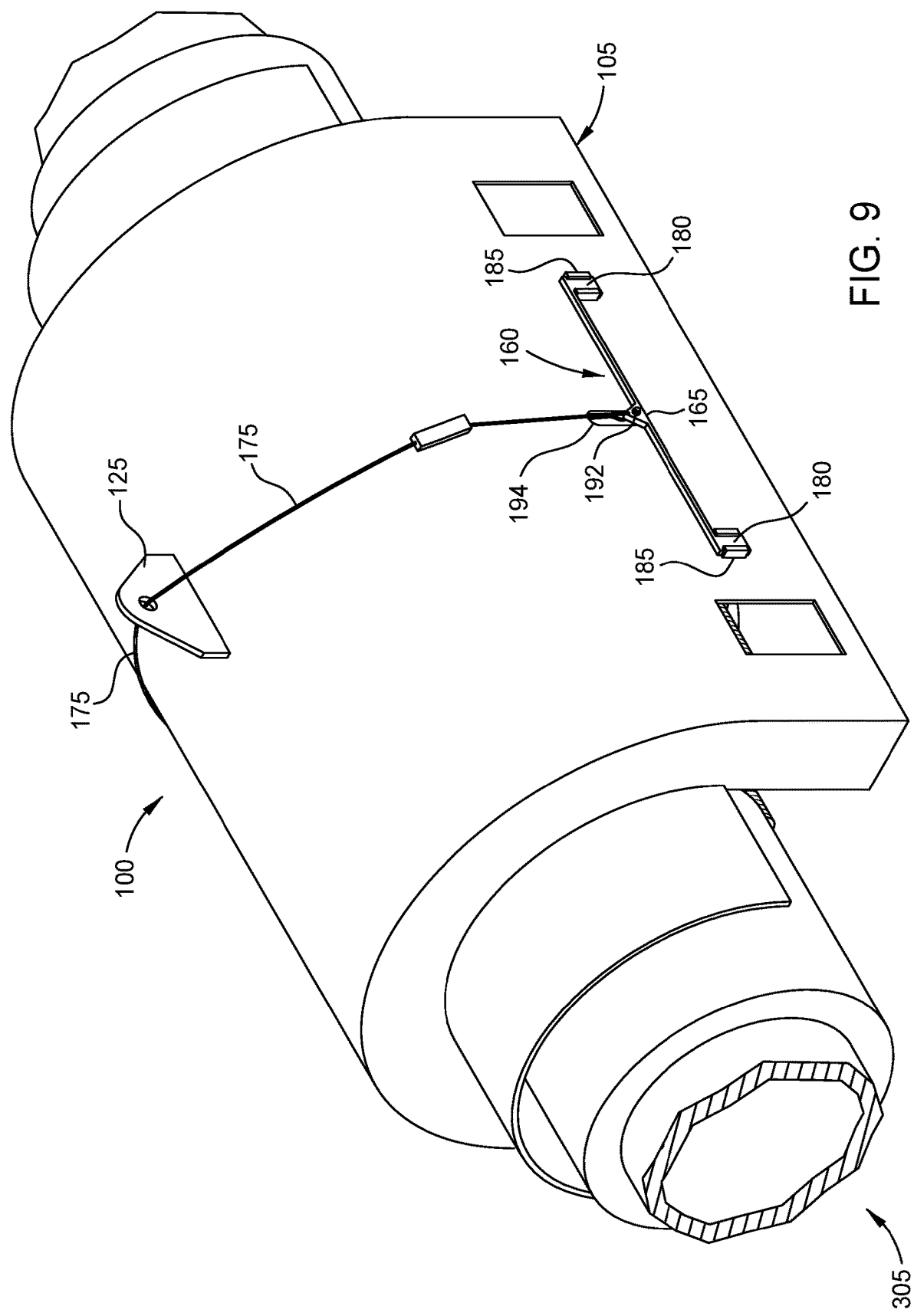
FIGS. 9-13 are various views showing the shroud installed onto the pipeline.
Figure 10:
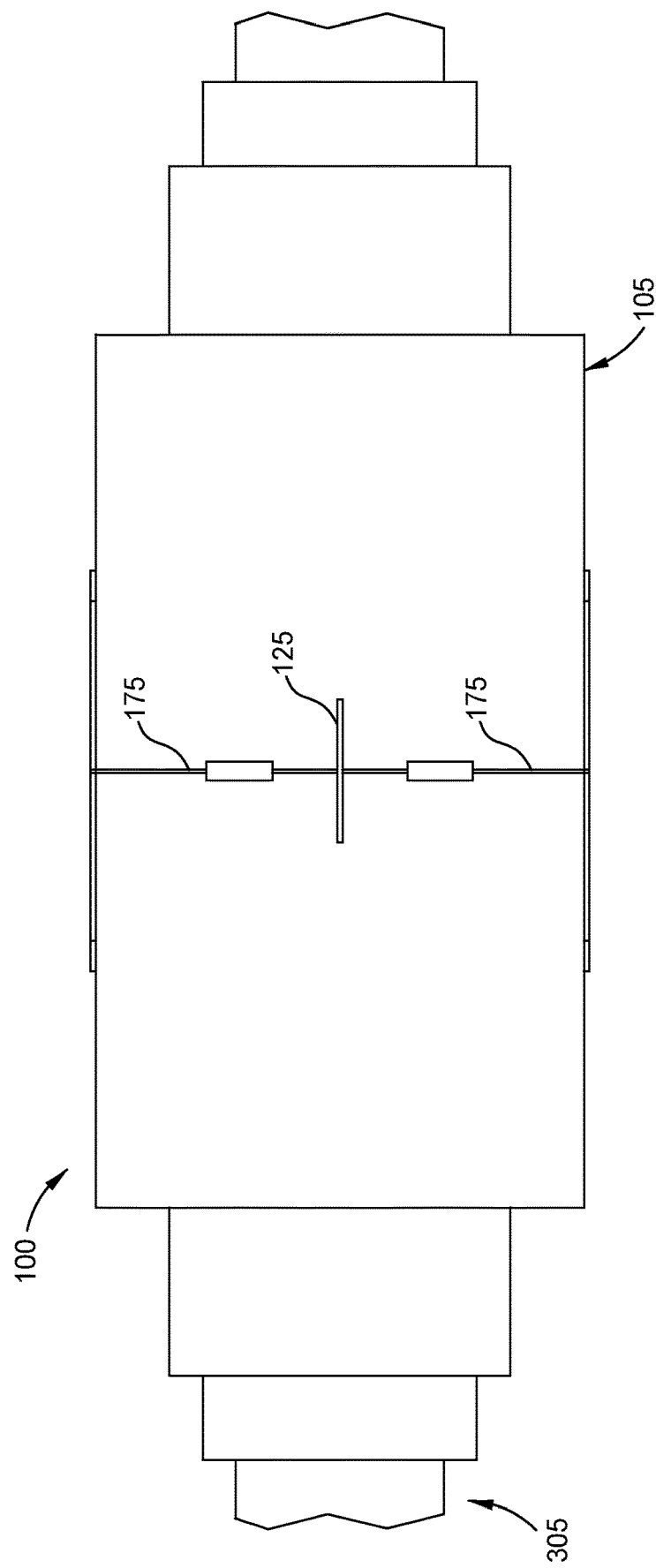
Figure 11:
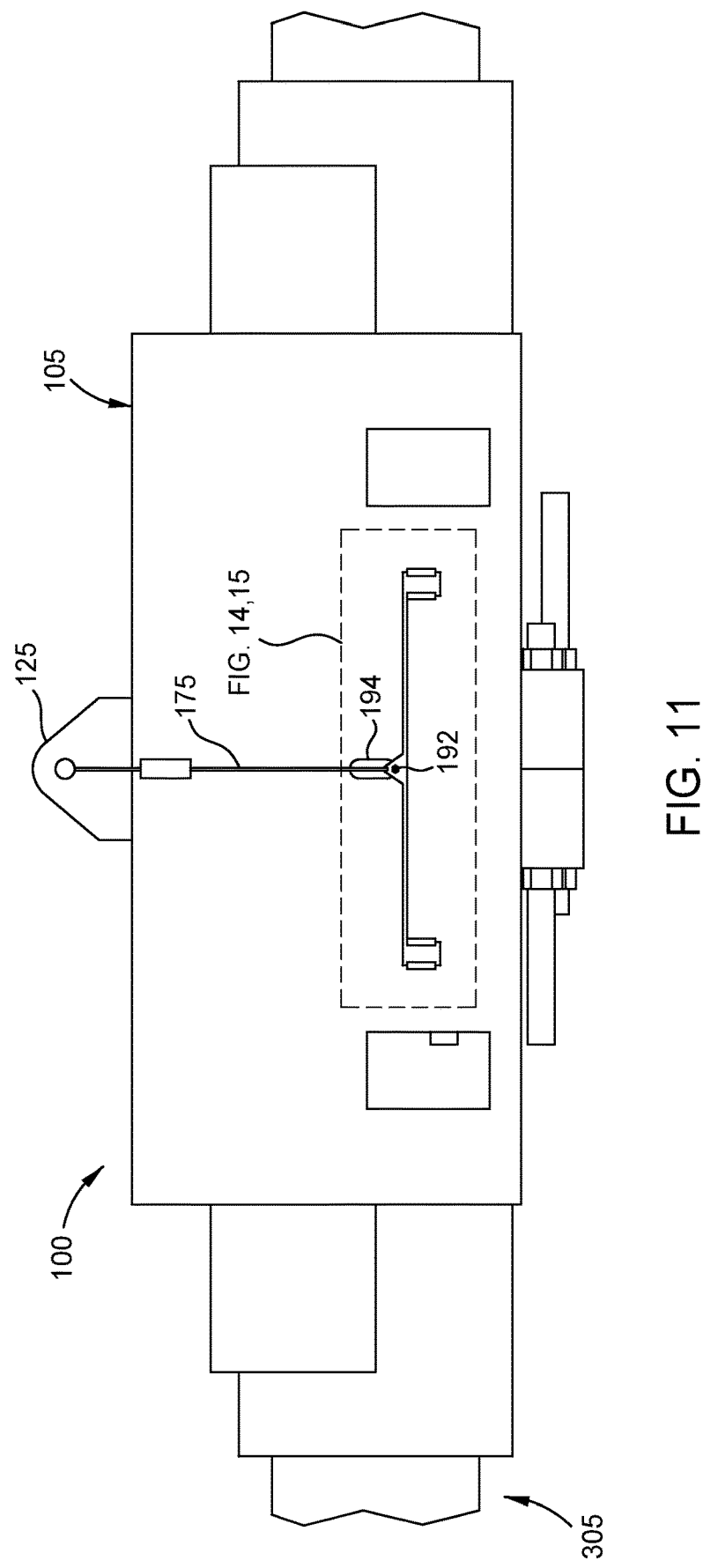
Figure 12:
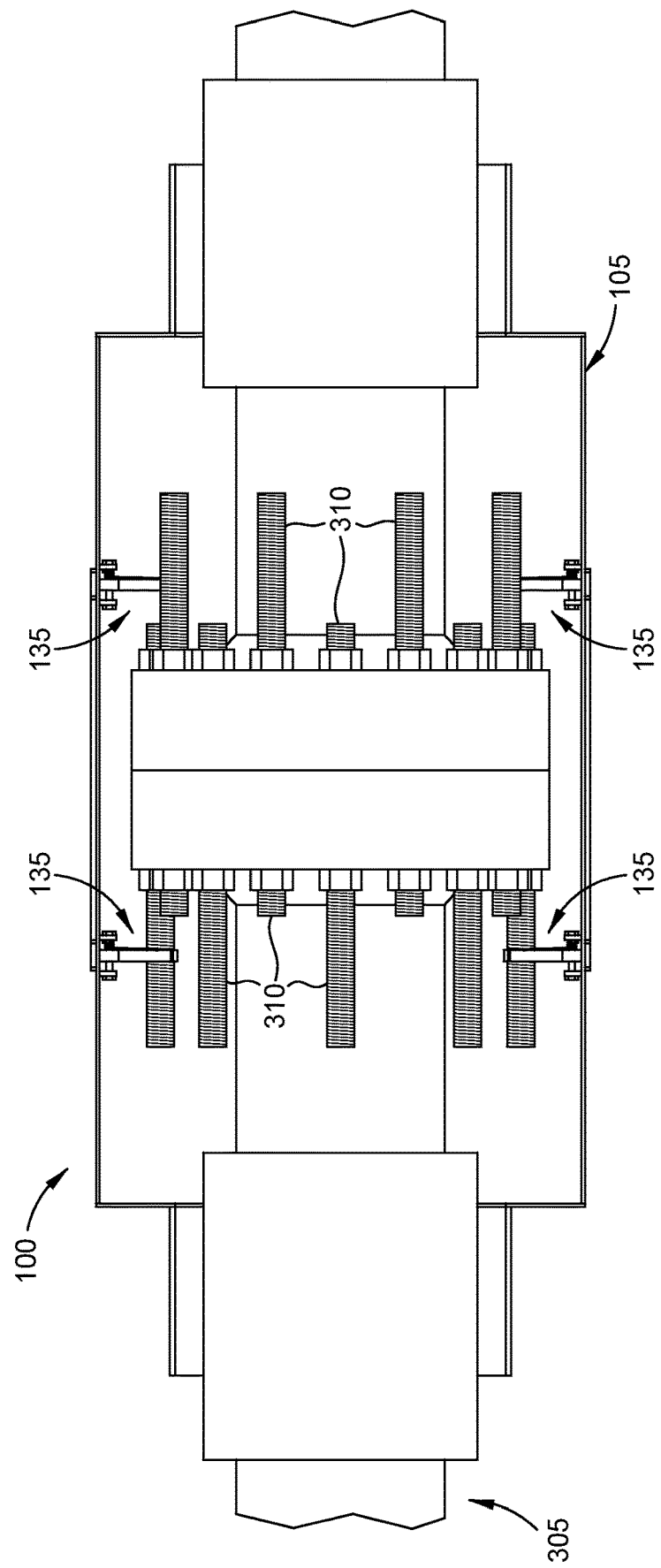
Figure 13:
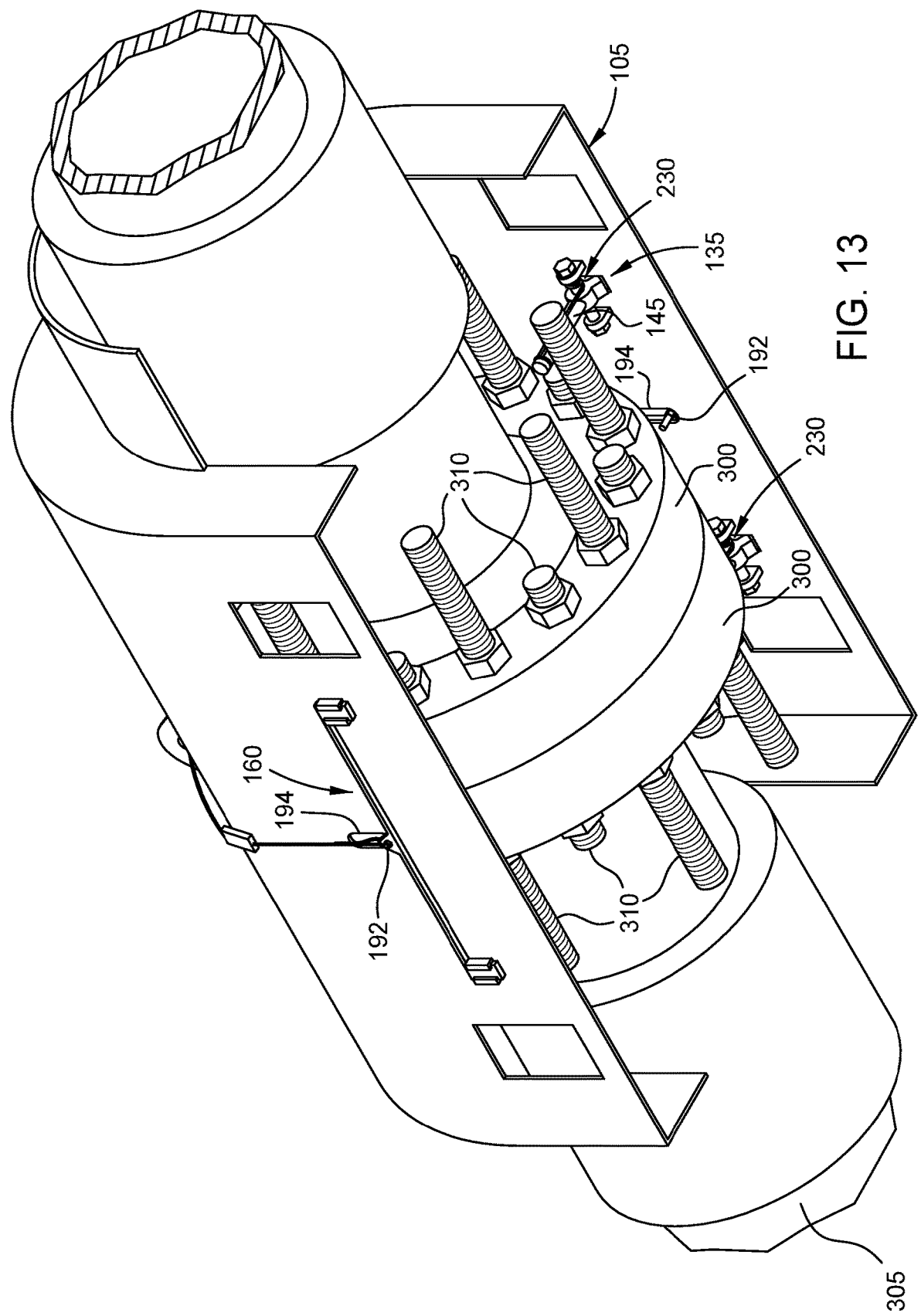

FIGS. 9-13 are various views showing the shroud 100 installed onto the pipeline 305. FIG. 9 is an isometric view of the shroud 100 installed onto the pipeline 305. FIG. 10 is a top view of the shroud 100 installed onto the pipeline 305. FIG. 11 is a side (front) view of the shroud 100 installed onto the pipeline 305. FIG. 12 is a bottom view of the shroud 100 installed onto the pipeline 305. In FIG. 12, the plurality of retaining members 135 are engaged with a respective stud of the plurality of studs 310. FIG. 13 is an isometric bottom view of the shroud 100 installed onto the pipeline 305. In FIG. 13, the rods 145 of the retaining members 135 are engaged with a respective stud 310 in a final mounted position. In this position, the shroud 100 is secured to the flange 300 of the pipeline 305.

Figure 14:
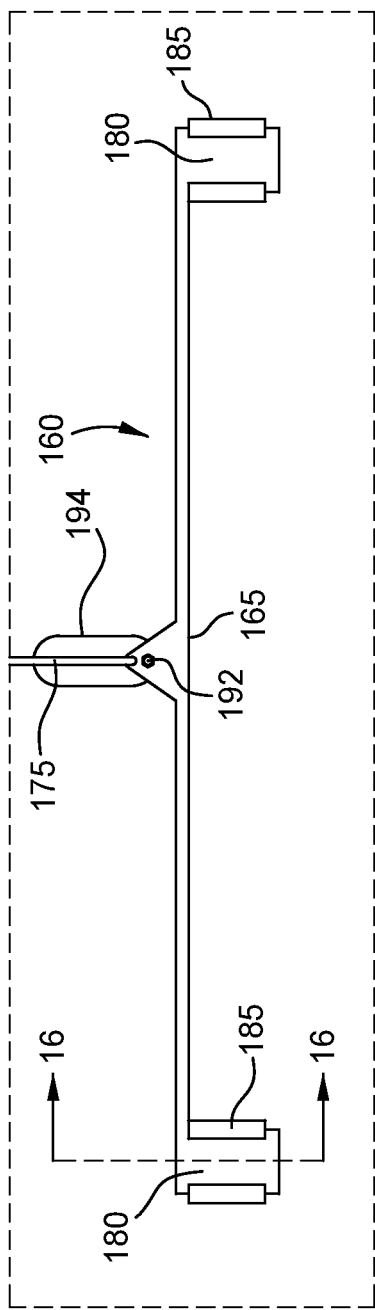
FIGS. 14-18 are various schematic views showing a process of removing the shroud.
Figure 18:
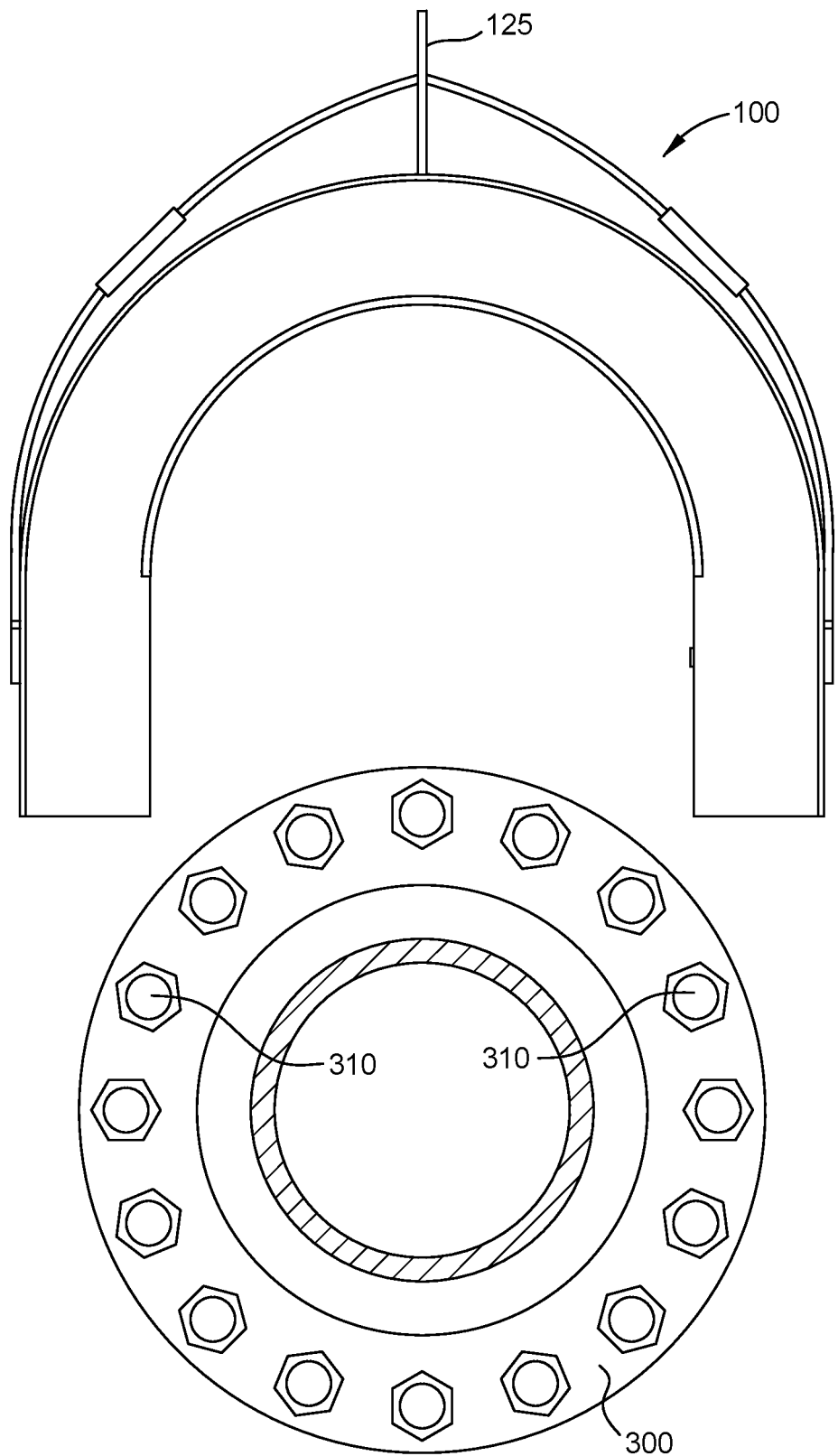

FIGS. 14-18 are various schematic views showing a removal process of the shroud 100. FIG. 14 shows the plates 180 covering the windows 230 and FIG. 15 shows the plates 180 being removed using the release member 160. In the views shown, the hook member 165 is raised to remove the plates 180 and expose the windows 230. FIG. 15 also shows the rotatable block 205 of the retaining members 135 through the windows 230. FIG. 16 shows the rods 145 in the engaged position wherein the radially extending member 225 of the rotatable block 205 limits movement of the rod 145 in the direction of arrow 190. However, as the plates 180 are removed, the radially extending member 225 of the rotatable block 205 extends into or through the respective window 230 which allows the rod 145 to rotate in the direction of arrow 190 as shown in FIG. 17. The movement of the rods 145 in the direction of arrow 190 disengages the retaining members 135 from the studs 310, and frees the shroud 100 from the flange 300 as shown in FIG. 17. FIG. 18 shows the shroud 100 completely removed from the flange 300.

In some embodiments, shown in FIG. 17, the shroud 100 includes the one or more blocks 195 that extend from the exterior surface 120. As discussed above, the one or more blocks 195 are utilized to limit the upward movement of the hook member 165 and/or the plates 180. The blocks 195 serve as a stop for the plates 180 allowing the plates 180 to be removed to expose the windows 230, but prevent the plates 180 from being completely released from the pockets 185.

Figure 19:
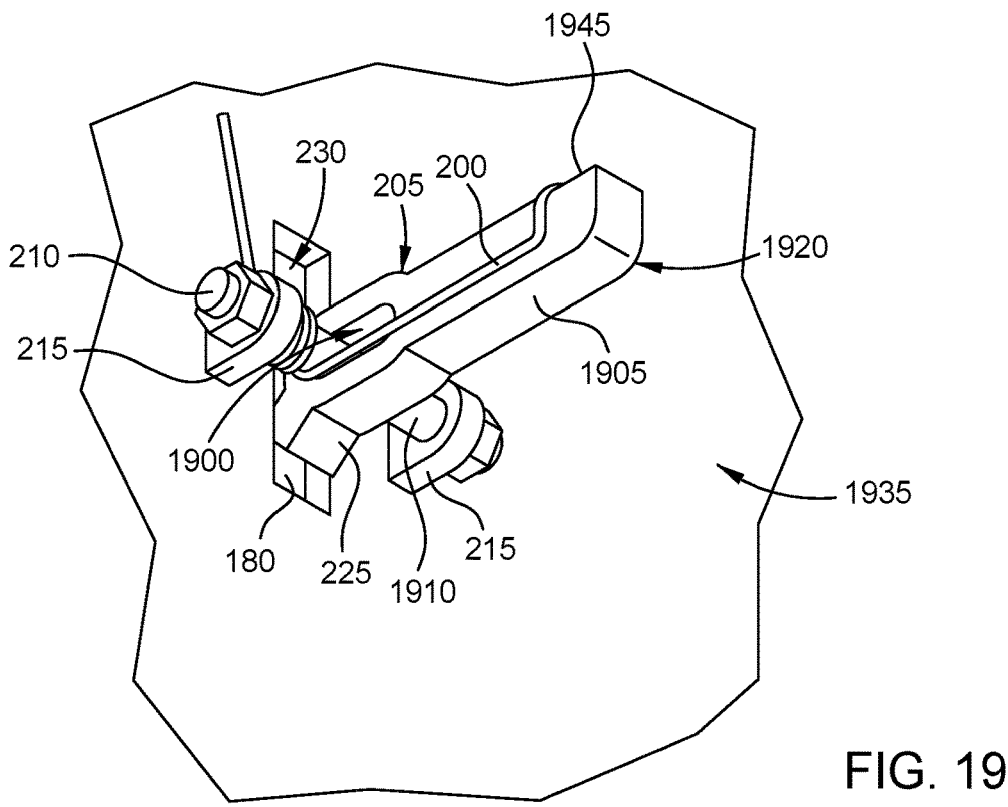
FIGS. 19 and 20 are isometric views of another embodiment of retaining members that may be used with the shroud of FIG. 1.
Figure 20:
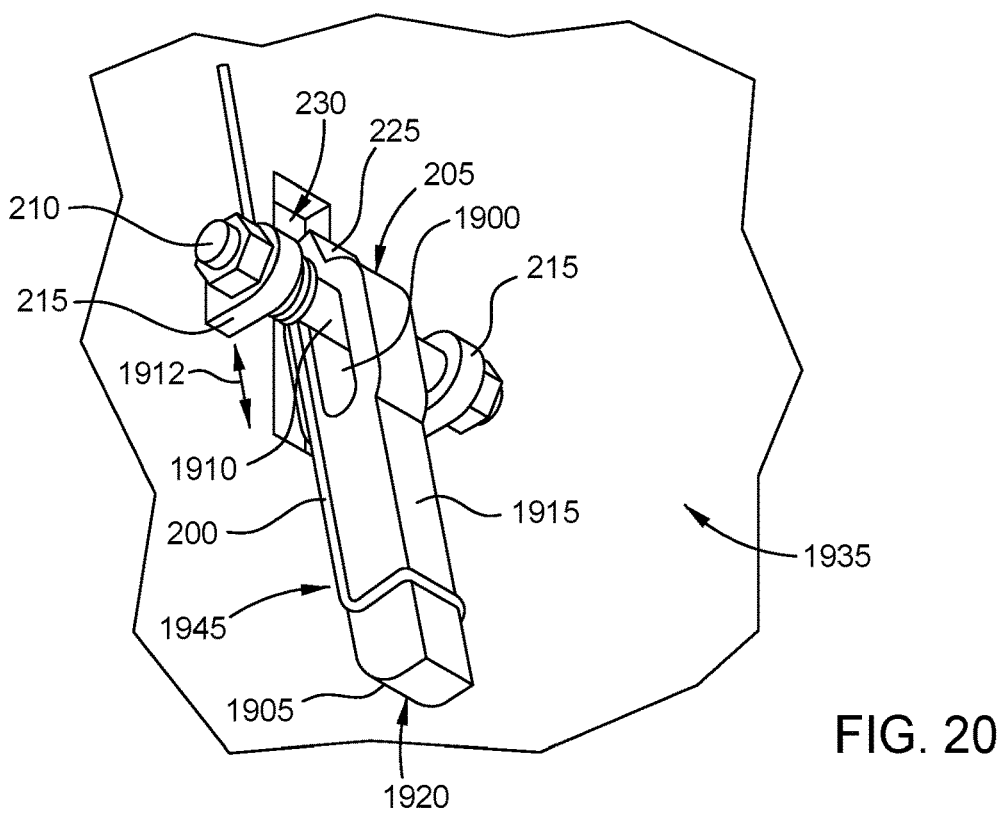

FIGS. 19 and 20 are isometric views of another embodiment of retaining members 1935 that may be used with the shroud 100 as described herein. In this embodiment, the retaining members 1935 are similar to the retaining members 135 described in other Figures with the following exceptions. The retaining members 1935 shown in FIGS. 19 and 20 include a longitudinally oriented slot 1900 formed as a rectangular arm 1945 (i.e., a movable rod) and a bottom contact surface 1905 is provided on the arm 1945. The bottom contact surface 1905 is generally flat along a length and a width thereof. The rectangular arm 1945 replaces the rod 145 shown and described in other Figures. In addition, the rectangular arm 1945 includes a rounded or chamfered end 1920

The longitudinally oriented slot 1900 allows the rectangular arm 1945 to adjust its length during installation of the shroud 100. The adjustment in length allows the rectangular arm 1945 to smoothly negotiate the available clearance between the studs 310 and the fastener 210 (i.e., a fulcrum). An outer surface 1910 of the fastener 210 comprises an elliptical cam profile that controls the projection (length) of the rectangular arm 1945 depending it's position with respect to a horizontal orientation. In the horizontal orientation (the locking position), the radially extending member 225, through its contact with the plate 180, will push the end 1920 to a maximum projection from the fastener 210, and when the rectangular arm 1945 is in a vertical orientation, the end 1920 will be at a minimum projection from the fastener 210. The bottom edge of the rectangular arm 1945 (i.e., the end 1920) is chamfered where at the intersection with the bottom contact surface 1905.

The rectangular arm 1945 also includes a flat upper contact surface 1915 (shown in FIG. 20). In the locked position, the flat upper contact surface 1915 provides a uniform contact pressure on the threads of the respective studs 310 as compared to contact pressure of a rod or arm with a circular profile. The chamfered end 1920 thus facilitates a smoother transition over the threads of the respective studs 310 during an installation (i.e., lowering operation) of the shroud 100.

While the foregoing is directed to embodiments of the disclosure, other and further embodiments of the disclosure may be devised without departing from the basic scope thereof, and the scope thereof is determined by the claims that follow.

The invention claimed is:

1. A shroud, comprising:
 a cover structure; and
 a plurality of retaining members coupled to an interior surface of the cover structure, wherein each of the plurality of retaining members comprises:
  an arm coupled to a hinge and a spring, the spring utilized to temporarily fix the arm in a position that is substantially orthogonal to a plane of the interior surface, wherein the hinge allows movement of the arm in a first direction and temporarily prevents movement of the arm in a second direction opposite to the first direction.

2. The shroud of claim 1, wherein the cover structure includes a movable plate associated with each of the plurality of retaining members.

3. The shroud of claim 2, wherein the arm is movable in the second direction when the movable plate is removed.

4. The shroud of claim 1, wherein the arm is rectangular-shaped and includes a flat bottom contact surface.

5. The shroud of claim 1, wherein the arm is rectangular-shaped and includes a flat upper contact surface.

6. The shroud of claim 1, wherein the arm is rectangular-shaped and includes a chamfered end.

7. The shroud of claim 1, wherein the arm is rectangular-shaped and includes a longitudinally oriented slot.

8. The shroud of claim 7, wherein the hinge includes a fastener that interfaces with the longitudinally oriented slot.

9. The shroud of claim 8, wherein the fastener is coupled to an interior surface of the cover structure by a plurality of spaced-apart ears.

10. A shroud, comprising:
 a cover structure sized to at least partially surround a flange of a pipeline;
 a plurality of retaining members coupled to an interior surface of the cover structure, each of the retaining members comprising a rectangular arm coupled to a pin; and
 a plate associated with each of the plurality of retaining members, each of the plates being fixed in a first position that allows movement of the rectangular arm in a first direction and temporarily prevents movement of the rectangular arm in a second direction opposite to the first direction, and each of the plates are movable to a second position that allows the rectangular arm to move in the second direction.

11. The shroud of claim 10, wherein each of the plurality of retaining members includes a spring that biases the rectangular arm in the second direction.

12. The shroud of claim 10, wherein the rectangular arm includes a flat bottom contact surface.

13. The shroud of claim 10, wherein the rectangular arm includes a flat upper contact surface.

14. The shroud of claim 10, wherein the rectangular arm includes a chamfered end.

15. The shroud of claim 10, wherein the rectangular arm includes a longitudinally oriented slot that interfaces with the pin.

16. A method for attaching a shroud to a flange of a pipeline, the method comprising:
 lowering a cover structure toward the flange such that a plurality of arms coupled to and extending from an interior surface of the cover structure contact one or more studs extending from the flange, wherein each of the plurality of arms are coupled to a spring that provides a bias to the respective arms in a first direction and a first position; and
 continually lowering the cover structure to substantially surround the flange such that a weight of the cover structure during the lowering overcomes the bias of the spring allowing the plurality of arms to move to a second position in a second direction opposite to the first direction and past the one or more studs, wherein each of the plurality of arms move in the first direction to return to the first position after the respective rod passes a stud.

17. The method of claim 16, wherein each of the arms include a longitudinal slot that is coupled to a pin.

18. The method of claim 17, wherein the pin is coupled to the interior surface of the cover structure by a plurality of spaced-apart ears.

19. The method of claim 16, wherein the cover structure includes a movable plate associated with each of the plurality of arms that restricts movement of the respective arm in the first direction when the plate is in a first position.

20. The method of claim 19, wherein the respective arm is freely movable in the first direction when the movable plate is in a second position.

* * * * *